INVENTORS
RANDLE L. ABBOTT
PAUL C. GREEN
BY
AGENT

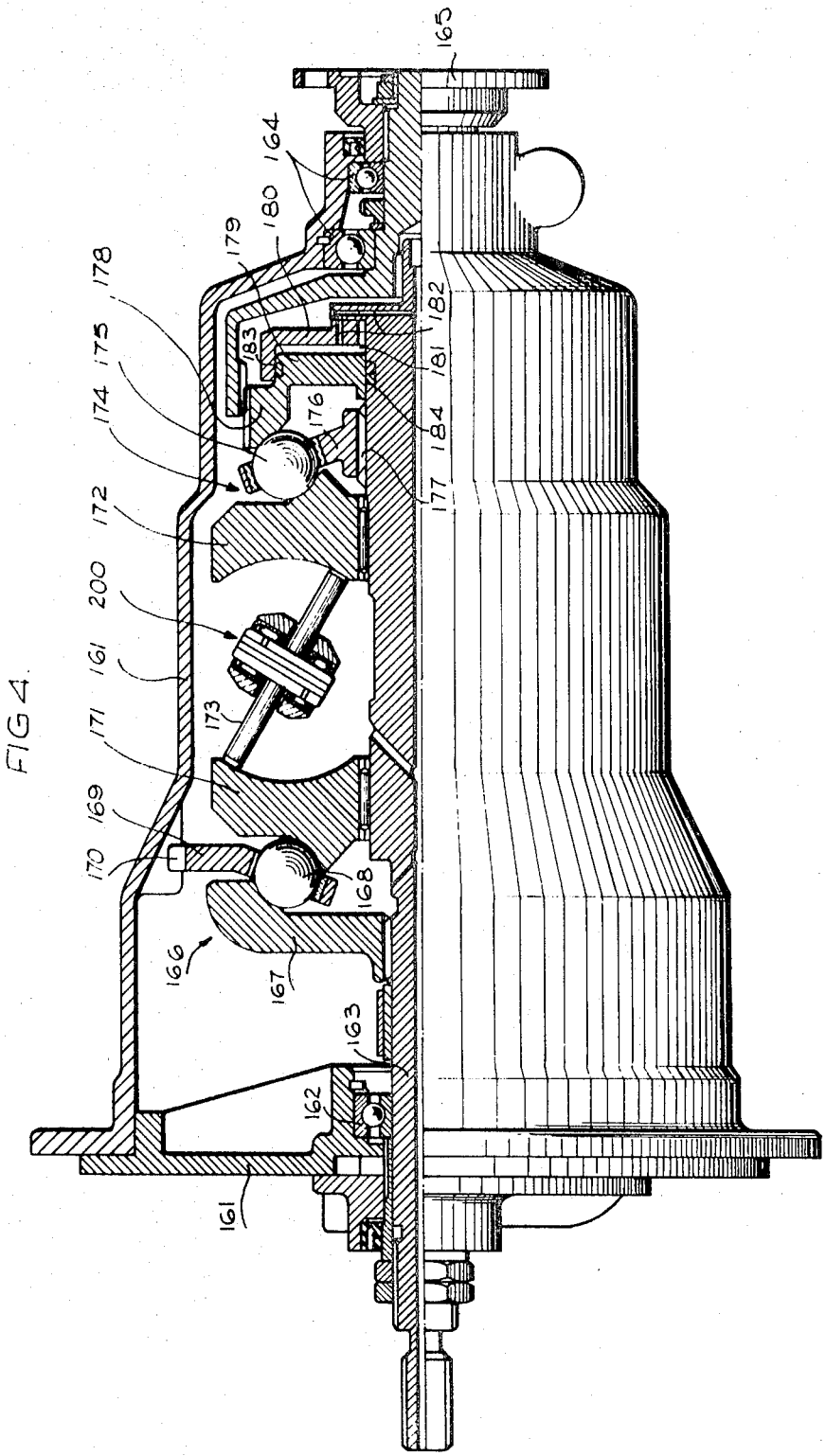

United States Patent Office 3,620,101
Patented Nov. 16, 1971

3,620,101
VARIABLE GEARS
Randle L. Abbott, Leamington Spa, and Paul C. Green, Coventry, England, assignors to GKN Birfield Transmissions Limited, Birmingham, England
Filed July 9, 1969, Ser. No. 840,413
Claims priority, application Great Britain, July 16, 1968, 33,755/68; Oct. 1, 1968, 46,455/68
Int. Cl. F16h *37/08*
U.S. Cl. 74—691
7 Claims

ABSTRACT OF THE DISCLOSURE

The specification discloses a steplessly-variable frictional gear which finds particular utility as an automotive transmission The gear includes a known unit comprising driving and driven co-axial discs having toroidal surfaces which are arranged in face to face relation and which are engaged by rollers whose inclinations can be varied to vary the gear ratio of the unit. Combined with the latter are first, constant-engagement drive means interposed between the input of the gear and the driving disc of the unit and second, constant-engagement drive means interposed between the output of the gear and the driven disc, the discs being arranged so that by varying the inclination of the rollers the gear gives:
(1) a reverse reduction drive in which the output member rotates in a direction opposite to, and at a speed less than, the input member;
(2) a neutral in which the output member is stationary and the first and second inputs to the second, constant-engagement drive means cancel each other out; and
(3) a forward drive in which the input and output members rotate in the same direction and in which the output member rotates at speeds both greater and less than the speed of the input member.

BACKGROUND OF THE INVENTION (1) Field of the invention

This invention relates to steplessly-variable frictional gears and is particularly, but not exclusively concerned with such gears for use in automotive vehicles.

(2) Description of the prior art

A gear with which the invention is concerned includes a unit of the type comprising driving and driven co-axial discs, hereinafter referred to as torus discs, having toroidal surfaces which are arranged in face-to-face relation and are engaged by rollers which, when the discs are urged together, transmit motion of the driving torus disc to the driven torus disc. By varying the angles of inclination of the axes of the rollers with respect to a plane perpendicular to the axis of rotation of the discs the gear ratio of the unit may be varied in a stepless manner. The rollers may be controlled automatically in dependence on the power or torque of a prime mover driving the gear or there may be a manual control or, more usually, there is both a manual and automatic control of the rollers. Such units are well known and will be referred to hereinafter as being "units of the type described."

One of the problems encountered with units of the type described when they include only a single pair of torus discs is that the input and output shafts or members rotate in opposite directions. This raises considerable practical difficulties in applying the units having only a single pair of discs for simplicity, but the same problem is also encountered in units including three torus discs in which the central or double torus disc is connected to the output.

Secondly, the range of effective gear ratios of a unit including but a single pair of torus discs is too restricted for general automotive use and it has therefore been proposed to have an epicyclic step-down drive at the output of the unit to provide low effective gear ratios and furthermore to provide means to lock together elements of the epicyclic drive to give the higher ratios required. In its turn this has meant that on engagement and disengagement of the clutch the rollers must change their inclinations through a considerable angle which is undesirable. Furthermore, means must be provided for operating the clutch, e.g. a hydraulic accumulator.

The object of the invention is to provide a gear in which these problems are overcome or at least substantially reduced in effect.

SUMMARY OF THE INVENTION

According to the invention we provide a unit comprising driving and driven co-axial torus discs having toroidal surfaces which are arranged in face to face relation, rollers interposed between and engaged with said surfaces of both discs and means to vary the inclinations of the rollers to vary the gear ratio of the unit; first, constant ratio, constant engagement, drive means interposed between the input member and the driving torus disc of the unit such that upon rotation of the input member the driving disc is rotated at a speed different from that of the input member and in a direction opposite to that of the input member; an output member; second constant engagement drive means of planetary form interposed between the unit and the output member, and comprising a series of planet members each of which is one of a ball and roller, a cage mutually locating said balls or rollers and connectable with the output member and first and second raceways with which the balls or rollers drivingly engage; a first input connection between the second drive means and the driven disc of the unit and a second input connection between the second drive means and one of the first drive means and the driving disc of the unit such that the speed and direction of the output member are derived solely from said connections; a shaft; a pair of spaced abutments fixed to the shaft; one of said abutments carrying the first raceway so that the latter is constrained to rotate with the shaft, the second raceway being carried by the driven disc; and force-applying means acting between one of said abutments and one of the driving torus disc and the first raceway to apply a force urging said torus discs together and the toroidal surfaces thereof into engagement with the rollers between the discs and to urge said races together and into engagement with the balls or rollers therebetween. By varying said angles of inclination of the rollers of the unit, the gear gives:

(1) A reverse reduction drive in which the output member rotates in a direction opposite to, and at a speed less, than the input member;
(2) A neutral hereinafter referred to as a geared neutral in which the output member is stationary and the first and second inputs to the second, constant-engagement drive means cancel each other out; and
(3) A forward drive in which the input and output members rotate in the same direction and in which the output member rotates at speeds both greater and less than the speed of the input member.

By "constant engagement drive means" we mean that the drive means consist of elements which are constantly engaged as distinct from elements such as clutches or brakes which are engageable and disengageable.

By the provision of the drive means, forward and reverse drives are available from the gear of ratios suitable for automotive use without the necessity of using either clutches or brakes such as have heretofore been used.

The invention will now be described in detail with reference to the accompanying drawings in which:

FIG. 4 is a view similar to FIG. 1 of a fourth embodiment of the invention.

Figure 1:
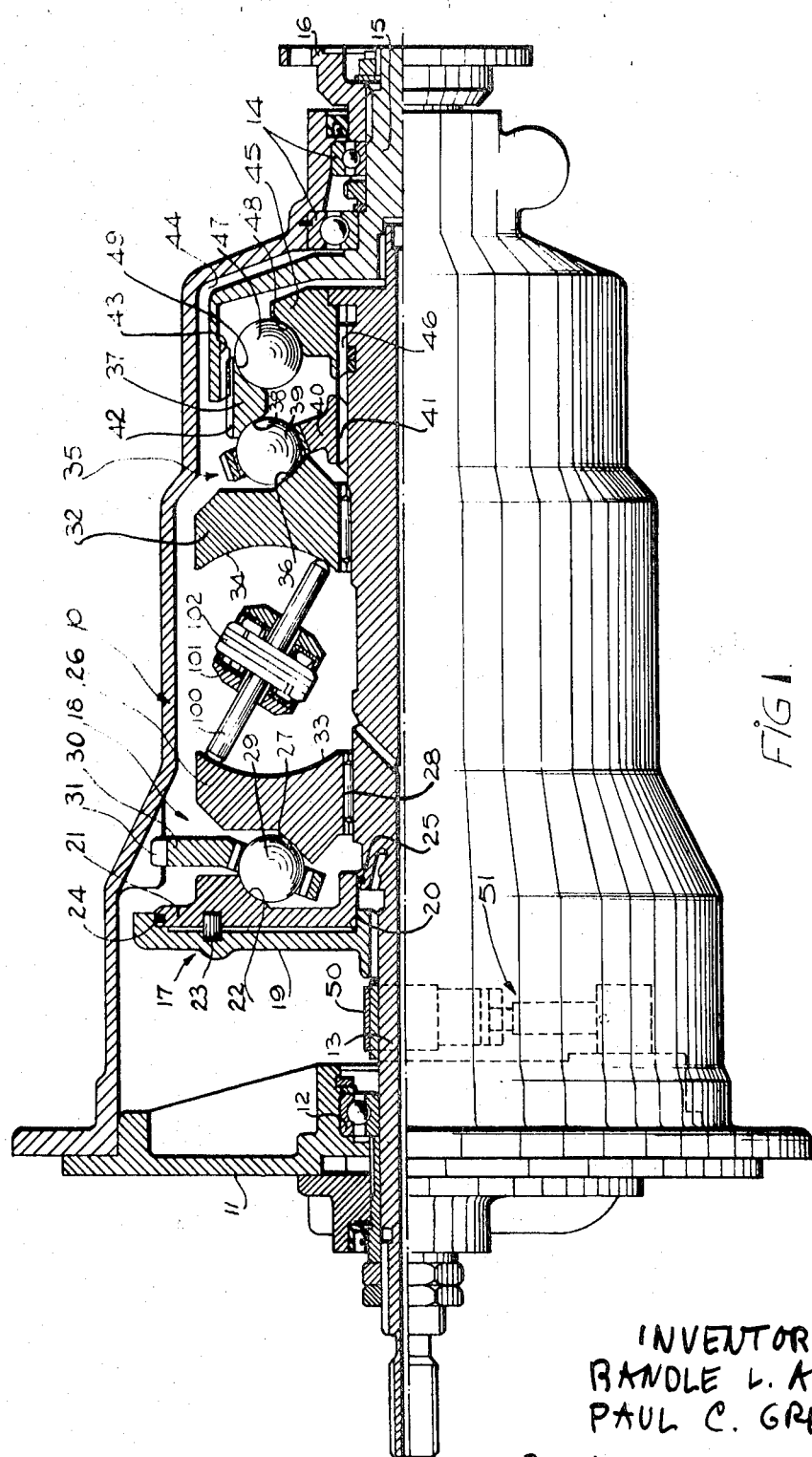
FIG. 1 is a vertical half section through a first embodiment of the invention.

Referring now to FIG. 1, the gear includes a casing 10 having a front plate 11. Mounted in a bearing 12 in the front plate 11 is an input shaft 13. Mounted in two bearings 14 at the rear of the housing is an output member 15 which carries at its rear end a flange 16 for connection to a transmission shaft.

Mounted on the input shaft 13 is a first race indicated generally at 17 of a first ball drive means 18. The race 17 comprises a disc-like member 19, which is provided with an annular cylinder 20, and a piston member 21 slidable in the cylinder 20 and which is provided with a raceway 22. A dowel 23 extends between the member 19 and the piston 21 to prevent relative rotation thereof. An outer annular seal 24 is interposed between the piston 21 and the outer wall of the annular cylinder 20 and an inner annular seal 25 is interposed between a portion of the piston member 21 and the input shaft 13.

A driving disc of a unit of the type described is indicated at 26 and this also provides a second race of the drive means 18, being provided with a raceway 27. The driving disc 26 is rotatably mounted on the input shaft 13 through a roller bearing 28. A series of balls, one of which is indicated at 29 is interposed between the raceways 22 and 27 and the balls are held in a cage 30 which is keyed at 31 to the casing 10.

The driven disc of the unit is indicated at 32 and a series of rollers, normally three, is interposed between the toroidal surfaces 33 and 34 of the discs 26 and 32 to transmit drive between the discs in a manner well known. One of these rollers is indicated at 100 and is mounted in bearings 101 in a carrier 102 which is operable by adjustment means, not shown, to vary the inclinations of the rollers.

The driven disc 32 also acts as a first race for second drive means indicated generally at 35, the disc 32 having a raceway 36 formed thereon. A ring 37 provides the second race for the drive means 35 having a raceway 38 thereon. A series of balls, one of which is indicated at 39, is held in a cage 40 which is keyed at 41 to the input shaft 13 and the balls 39 engage the raceways 36 and 38.

The outer periphery of the ring 37 is formed with splines 42 which engage splines 43 on a part 44 of the output member.

Thrust means is provided comprising a first race 45 keyed at 46 to the input shaft 13 and a second race formed by the ring 37 and a series of balls, one of which is shown at 47 interposed between the races. The balls 47 engage with raceways 48 and 49 on the race 45 and ring 37 respectively.

A cam 50 is mounted on the input shaft and operates a hydraulic pump indicated generally at 51.

The operation of the embodiment thus far described is as follows. Upon rotation of the input shaft 13 in, say, a clockwise direction the pump 51 is driven by the cam 50 and delivers hydraulic fluid to the cylinder 20 behind the piston 21 thus tending to move the piston 21 to the right in FIG. 1. This has the result of loading the first and second ball drive means 18 and 35 and also tending to urge the discs 26 and 32 together and into engagement with the rollers 100. The thrust means comprising the race 45, the balls 47 and the ring 37 provide what may be considered to be a rotatable abutment against which the piston 21 can operate.

When the piston 21 has been moved to the right and the drive means 18 and 35 and the discs 26 and 32 loaded as described then drive will take place from the first race 17 through the balls 29 to the driving disc 26 of the unit. If the input shaft 13 is rotating in a clockwise direction then the disc 26 will rotate in an anti-clockwise direction and, due to the relative diameters of the raceways 22 and 27, will rotate at a speed greater than the speed of the input shaft 13. Drive will then be transmitted from the driving disc 26 to the driven disc 32 by the rollers 100 and drive will take place through the second drive means 35 to the ring 37. The speed of the ring 37 will depend on the difference in speeds between the driven disc 32 of the unit and the input shaft 13 to which the cage 40 is keyed. It will be appreciated that as the inclinations of the rollers 100 between the discs 26 and 32 is varied, the drive to the ring 37 will vary from clockwise to anti-clockwise through a geared neutral position in which the ring 37 is stationary due to the rotation of the driven disc 32 and the cage 40 cancelling each other out. It is found that by speeding up the driving disc 26 through the drive means 18 the neutral position can be arranged at such an inclination of the rollers 100 that a sufficient range of effective gear ratios is obtained for automotive use, these ratios being obtained with the output member 15 rotating in the same direction as the input shaft 13. It will be appreciated that the output member 15 is driven through the splined connection 42, 43 from the ring 37.

Figure 2:
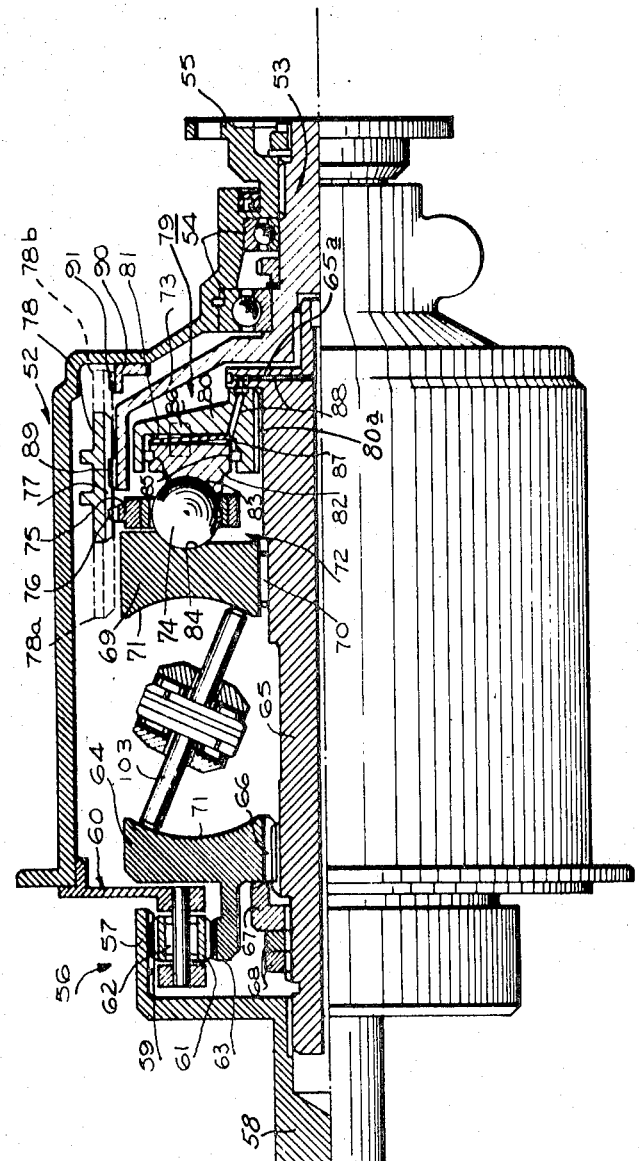
FIG. 2 is a view similar to FIG. 1 of a second embodiment of the invention.

Referring now to FIG. 2, this shows a second embodiment of the invention. Referring to this figure, the gear comprises a casing 52 having mounted at the rear thereof an output member 53 in bearings 54. The output member carries a flange 55 for connection to a transmission shaft. At the front of the casing there is first drive means indicated generally at 56 such means comprising an annulus 57 which is formed integrally with an input shaft 58, the annulus has a series of internal teeth 59. A carrier is indicated generally at 60 and carries wheels 61 on bearings 62, the wheels engaging with the teeth 59 and also with an annulus of teeth 63 formed on a driving disc 64 of a unit of the type described. The driving disc 64 is keyed to an intermediate shaft 65 at 66 and is constrained from moving axially to the left in the figure by a collar 67 and nuts 68. A driven disc 69 of a unit of the type described is mounted on bearings 70 on the intermediate shaft 65. The discs 64 and 69 are provided with toroidal surfaces 71 between which act rollers 103 to transmit drive between the discs in a known manner.

Second drive means indicated generally at 72 are interposed between the driven discs 69 and a part 73 of the output member 53. These second drive means are in the form of a ball drive and comprise a series of balls, one of which is shown at 74 carried in a cage 75 which is splined at 76 to engage with internal splines 77 on a sliding annulus 78. A first race for the ball drive means is indicated generally at 79 and comprises a disc-like member 80 in which is formed a cylinder 81. Mounted in the cylinder is a piston 82 which is provided with a raceway 83 which is engaged by the balls 74. The second race of the drive is provided by the driven disc 69 which is provided with a raceway 84. The piston 82, which is annular, is sealed in the cylinder 81 by seals 85 and is prevented from rotating relative to the cylinder by a dowel 86. A spring 87 urges the piston 82 to the left in FIG. 2. Hydraulic fluid may be admitted to the cylinder 81 through passages 88 in the shaft 65 and the disc-like member 80. The disc 80 is splined to the shaft 65 at 80a and engages a shoulder 65a on the shaft 65 and which forms an abutment for the reaction of the hydraulic fluid introduced into the cylinder 81.

The part 73 of the output member 53 is externally splined at 89 so as to be engageable with the internal splines 77 of the annulus 78. A ring 90 is mounted on the casing 52 and is provided with external splines 91 which are engageable with the internal splines 77 of the annulus 78. The annulus 78 is movable, by means not shown, from the position shown in full lines to a position indicated at 78a in which the cage 75 is disconnected from the part 73 of the output member 53 to a position indicated at 78b where the part 73 is connected to the ring 90 thus preventing rotation of the output member 53. It will be appreciated that in the latter position the annulus 78 is clear of the cage 75.

The operation of the embodiment shown in FIG. 2 will now be described. Upon rotation of the input shaft 58 a hydraulic pump, not shown, but operated in a manner similar to the pump 51 of FIG. 1, will deliver hydraulic fluid to the cylinder 81 through the passages 88. This will have the effect of loading the second ball drive means 72 and also urging the discs 64 and 69 together and into engagement with the rollers 103 thus rendering the unit operable. Rotation of the shaft 58 in a clockwise direction will, through the first drive means 56, rotate the driving disc 64 and thus the intermediate shaft 65 in an anti-clockwise direction at a speed greater than that of the input shaft 58. The drive will then be transmitted between the discs 64 and 69 by the rollers 103 and drive will pass from the driven disc 69 through the ball drive means 72 to the annulus 78, assuming that the latter is in the full line position shown. Drive will also be transmitted from the first drive means 56 through the shaft 65, the member 80 and the piston 82 to the balls 74 forming a second input to the ball drive means 72. Drive will then be transmitted to the output member 53 through the splines 77 and 89. The ratios of the first and second drive means 56 and 72 will be chosen to give the desired overall speed ratios of the gear.

The annulus may be slid to the position 78a to disconnect the cage 75 from the output member 53 and the gear will then be in neutral, there being no mechanical connection between the input shaft 58 and the output member 53. The annulus 78 may be slid to the position 78b in which the output member will be locked relative to the casing of the gear and will thus act as a "parking brake" for the gear. In addition to this mechanical neutral, the rollers 103 may be adjusted to give a geared neutral as described above.

The spring 87 will provide an initial force on the ball drive 72 which will enable a car to which the gear is fitted to be started by towing, the drive to the engine passing reversely through the gear.

Because the output of the second drive means is taken from the cage in the arrangement of FIG. 2 rather than from the annulus as in FIG. 1 the torque transmitted in the low speed ratios of the gear is less in the arrangement of FIG. 2 than in the arrangement of FIG. 1. Also a mechanical neutral is provided as described above.

Figure 3:
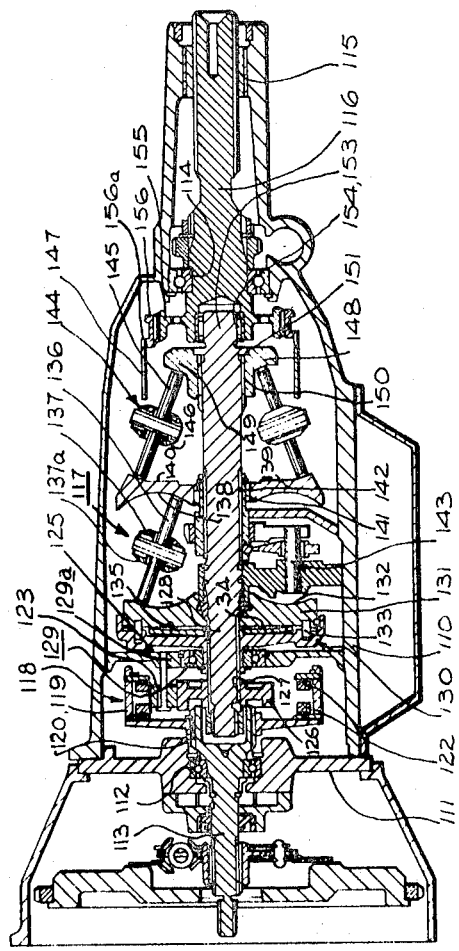
FIG. 3 is a vertical section through a third embodiment of the invention.

Referring now to FIG. 3 this illustrates a further embodiment of the invention which includes a casing 110 having a front plate 111. Mounted in a bearing 112 in the front plate 111 is an input shaft 113. Supported by two bearings 114 and 115 at the rear of the casing is an output member 116 which is splined for connection to a transmission shaft.

The gear includes a unit of the type described indicated generally at 117 and first, constant-engagement drive means indicated generally at 118. The constant-engagement drive means 118 comprises an annulus 119 which is splined at 120 to the input shaft 113. The annulus 119 carries a split ring 122 which engages with rollers 123 mounted on shafts 124 which are mounted in a web 125 of the casing. The rollers 123 engage with a roller 126 which is splined at 127 to an intermediate shaft 128 supported at its left-hand end in a bearing 129.

Keyed to the intermediate shaft 128 is a cylinder member 130 which has a spigot received in the bearing 129 and which contains a piston 131 which constitutes the driving torus disc of the unit 117; the disc has a toroidal surface 132. The disc 131 is prevented from rotating relative to the cylinder member 130 by pegs 133 and is urged away from said member by a plate spring 134. A cavity 135 is formed between the disc 131 and the cylinder member 130, which cavity can be filled with hydraulic-pressure fluid for a purpose to be described. The bearing 129 is located in the web 125 by a circlip 129a which prevents axial movement of the bearing and thus of the member 130 which forms an abutment to take the reaction of the force exerted by the hydraulic pressure fluid.

The unit 117 also includes a plurality of rollers, one of which is indicated at 136 mounted in bearings 137 in a carrier 137a. The rollers 136 engage the toroidal surface 132 of the driving torus disc 131 and also a toroidal surface 138 of a unitary member 139 which constitutes both the driven torus disc of the unit and a first disc of a further unit, having a second toroidal surface 140. The member 139 is freely rotatably mounted at 141 on a sleeve 142 forming part of adjustment means indicated generally at 143 which is operable to alter the inclinations of the rollers 136 thus to vary the velocity ratio of the unit.

Second constant-engagement drive means is indicated generally at 144 and is basically similar to the unit 117 except that the rollers of the drive means are not adjustable in inclination. The drive means 144 thus includes a plurality of rollers, one of which is indicated at 145, mounted in bearings 146 in a carrier, part of which is illustrated at 147. The drive means 144 comprises a first disc which in fact is constituted by the member 138 having the toroidal surface 140, and a second torus disc 148 having a toroidal surface 149. The disc 148 is keyed at 150 to the shaft 128 and engages a shoulder 151 of the shaft 128 so as to be capable of providing a reaction abutment to the force exerted by the piston and cylinder assembly 130, 131 as will hereinafter be described.

The output member 116 is provided with a counterbore 152 in which a spigot 153 at the end of the intermediate shaft 128 is rotatably mounted through a needle roller bearing 154. The output member 116 is also provided with an externally splined flange 155 which engages with an internally splined sleeve 156. The sleeve 156 is provided with dogs 156a which engage with dogs 147a on the carrier 147.

The operation of the gear is as follows, drive is taken from the engine through the input shaft 113 and is transmitted to the annulus 119 and from thence through the roller drive 122, 123 and 126, to the intermediate shaft 128. The intermediate shaft 128 will thus rotate in a direction opposite to the direction of rotation of the input shaft 113.

Hydraulic fluid is supplied to the cavity 135 of the piston and cylinder assembly 130 and 131 thus urging the driving disc 131 of the unit 117 to the right which in turn urges the member 139 to the right through the rollers 136 and this thrust is resisted through the rollers 145 by the second torus disc 148 engaging the shoulder 151. The thrust exerted by the piston/cylinder assembly 130, 131 is thus wholly contained on the intermediate shaft 128. The thrust obtained is sufficient to enable drive to take place from the disc 131 to the disc 139 through the rollers 136 and further drive to take place from the disc 139 to the disc 148 through the rollers 146, so that the carrier 147 thus drives the output member 116 through the connection comprising the flange 155 and the sleeve 156.

The inclinations of the rollers 145 are fixed but the inclinations of the rollers 136 can be varied by the adjustment means 143 so that the gear as a whole will give:

(1) A reverse reduction drive in which the output member 116 rotates in a direction opposite to, and a a speed less than, the input member 113, (2) A forward drive in which the input and output members 113 and 116 rotate in the same direction and in which the output member 116 rotates at speeds both greater and less than the speed of the input member, and (3) A geared neutral.

The gear can be placed in mechanical neutral by sliding the sleeve 156 to disengage the dogs 156a and 147a.

FIG. 4 shows a further embodiment of the invention, the gear including a casing 160 having a front plate 161.

Mounted in a bearing 162 in the front plate is an input shaft 163. Mounted in two bearings 164 at the rear of the casing is an output member 165 having a flange for connection to a transmission shaft.

First, constant-engagement drive means is indicated at 166 and comprises a first race 167 keyed to the input shaft 163, a series of balls, 168, located in a cage 169 splined at 170 to the casing 160 and a member 171 which provides a second race for the drive means 166 and also a first torus disc for unit 200 of the type described. The member 171 is freely rotatably mounted on input shaft 163 and drives a driven torus disc 172 through rollers 173 arranged in a manner similar to that described above.

Second constant-engagement drive means is indicated generally at 174 and comprises a series of balls 175 carried in a cage 176, keyed at 177 to the input shaft 163. The balls are interposed between the driven torus disc 172 which provides a first race for the drive means and a member 178 which provides a second race for the drive means. The member 178 has a portion 179 which is in the form of a piston fitting within a cylinder 180 secured to the right-hand end of the input shaft 163. A cavity 181 is provided between the piston 179 and the cylinder 180 and hydraulic fluid may flow to the cavity through passages 182. Running seals 183 and 184 are provided between the piston 179 and the cylinder 180 and the input shaft 163 respectively.

The ball drives constituting the drive means 166 and 174 are pressurised by pressurising the cavity 181 which as will be seen will apply pressure both to the ball drives and tend to move the members 171, 172 together so that the rollers 173 transmit drive between the member 171 and the member 172. In operation, therefore, the member 171 will rotate at a speed different from, and in a direction different from, the input shaft 163 and will drive the member 172 which in turn will drive the member 178. The drive to the member 178 will thus be partly from the member 172 and partly from the input shaft 163 through the splined connection 177 with the cage 176.

The inclinations of the rollers 173 may be changed as described above to give the same variations in drive as may be obtained from the other embodiments described above.

It will be seen that the invention provides various arrangements of steplessly-variable, frictional gears which are comparatively simple but which have a range of output making them suitable for use in automotive vehicles.

Each of the ball-type constant-engagement drive means i.e. 18 and 35 in FIG. 1; 72 in FIG. 2 and 166 and 174 in FIG. 4: the roller drive means 118 of FIG. 3 and each of the units 23, 32 of FIG .1; 64, 69 of FIG. 2; 117 and 144 of FIG. 3 and 200 of FIG. 4; relies on the shearing of an oil film between two engaging parts to transmit torque between said parts.

We claim:

1. A steplessly variable, frictional gear comprising an input member; a unit comprising driving and driven coaxial torus discs having toroidal surfaces which are arranged in face to face relation, rollers interposed between and engaged with said surfaces of both discs and means to vary the inclinations of the rollers to vary the gear ratio of the unit; first constant ratio, constant engagement, drive means interposed between the input member and the driving torus disc of the unit such that upon rotation of the input member the driving disc is rotated at a speed different from that of the input member and in a direction opposite to that of the input member; an output member; second, constant engagement drive means of planetary form interposed between the unit and the output member, and comprising first and second raceways, a series of planet members interposed between, and frictionally engaging, the raceways, and a cage drivingly engaged with the planet members and holding them apart; means interconnecting the cage and the output member; a first input connection between the second drive means and the driven disc of the unit and a second input connection between the second drive means and one of the first drive means and the driving disc of the unit such that the speed and direction of the output member are derived solely from said connections; a shaft; a pair of spaced abutments fixed relative to the shaft; one of said abutments carrying the first raceway so that the latter is constrained to rotate with the shaft, the second raceway being carried by the driven disc; and force-applying means acting between one of said abutments and one of the driving torus disc and the first raceway to apply a force urging said torus discs together and the toroidal surfaces thereof into engagement with the rollers between the discs and to urge said raceways together and into engagement with the planet members therebetween.

2. A gear according to claim 1 including a releasable connection between the output member and the cage of the second drive means so that the cage may be disconnected from the output member.

3. A gear according to claim 2 including means for locking the output member to a stationary abutment.

4. A gear according to claim 3 wherein the connection between the output member and the cage and the means for locking the output member to the casing comprises a slide movable between a first position in which the cage is disconnected from the output member, a second position in which the cage is connected to the output member and a third position in which the output member is connected to a stationary abutment.

5. A gear according to claim 1 wherein the first raceway is rigid with said one abutment and said force applying means acts between the other abutment and the driving torus disc which are connected to rotate together.

6. A gear according to claim 5 wherein the driving torus disc is in the form of a piston fitting into a cylinder in said other abutment, the force applying means being arranged to introduce hydraulic fluid into the cylinder to load the piston.

7. A gear according to claim 1 wherein the first and second raceways have toroidal surfaces.

References Cited

UNITED STATES PATENTS

| 1,833,475 | 11/1931 | Standish | 74—690 |
| 3,494,224 | 2/1970 | Fellows et al. | 74—691 |

FOREIGN PATENTS

| 957,145 | 5/1964 | Great Britain | 74—690 |

MILTON KAUFMAN, Primary Examiner